United States Patent [19]
Lewison

[11] 3,814,051
[45] June 4, 1974

[54] CONTACT LENS AND APPARATUS FOR PRODUCING SAME

[76] Inventor: Lawrence Lewison, Briarwood Crossing, Lawrence, N.Y. 11559

[22] Filed: Nov. 29, 1972

[21] Appl. No.: 310,391

[52] U.S. Cl. .................................. 118/49, 118/500
[51] Int. Cl. ............................................. C23c 13/08
[58] Field of Search ........................... 118/48–49.5, 118/500; 51/216 LP

[56] References Cited
UNITED STATES PATENTS

| | | | |
|---|---|---|---|
| 2,224,168 | 12/1940 | Tillyer et al. | 51/216 LP |
| 2,271,239 | 1/1942 | Vokes | 118/49 |
| 2,847,325 | 8/1958 | Riseman et al. | 118/49 X |
| 3,490,182 | 1/1970 | Lanman | 51/216 LP |
| 3,699,917 | 10/1972 | Deverse et al. | 118/49 |

OTHER PUBLICATIONS

RCA Technical Notes, "Evaporating Fixture For Flat Substrates" Meshulam, A. M.–No. 328 [Nov. 1959]

*Primary Examiner*—Morris Kaplan
*Attorney, Agent, or Firm*—Bauer & Amer

[57] ABSTRACT

Rectilinear lens holders span arcuate supports which are radially uniformly disposed with respect to a vapor source of the hydrophilic material. Each holder has an adhesive surface means whereby to attach said lenses.

1 Claim, 6 Drawing Figures

PATENTED JUN 4 1974  3,814,051
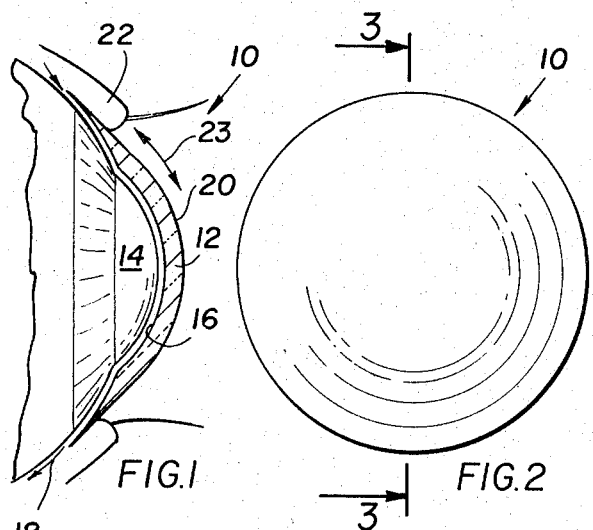
FIG.1  FIG.2
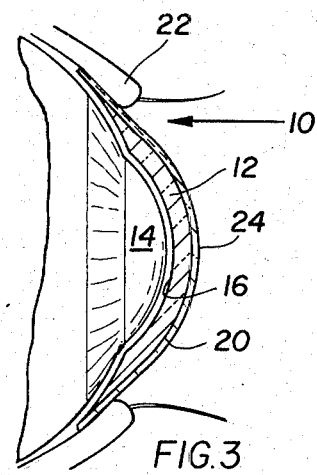
FIG.3
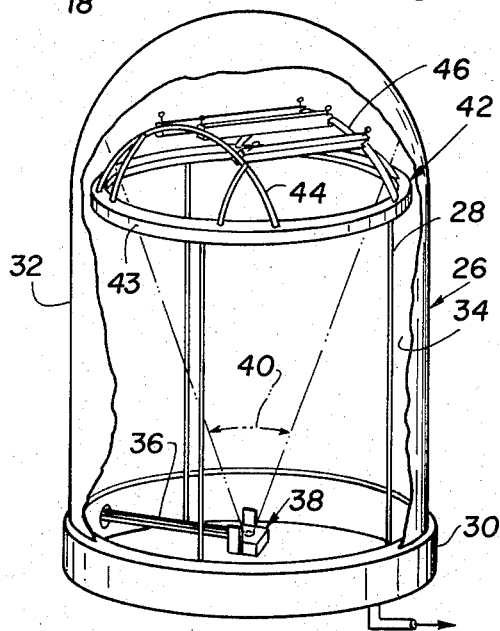
FIG.4
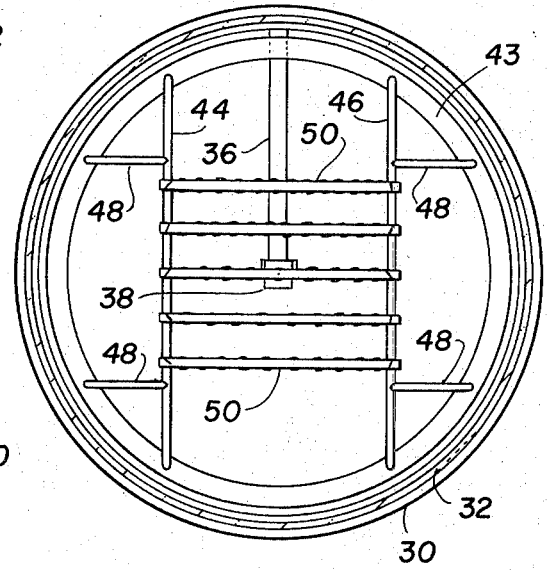
FIG.6
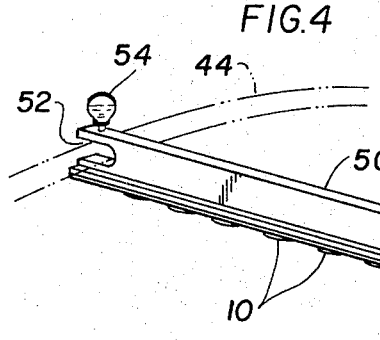
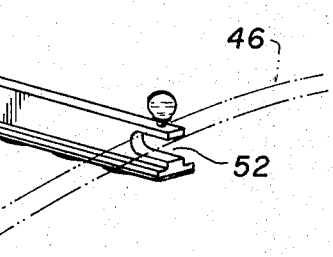
FIG.5

CONTACT LENS AND APPARATUS FOR PRODUCING SAME

The present invention relates generally to plastic contact lenses, and more particularly to an improved contact lens having the favorable optical properties of methyl-methacrylate plastic, but not the non-wetting or hydrophobic disadvantage thereof.

A methyl-methacrylate plastic contact lens is known to be hydrophobic or water-repellant and, as such, contributes to drying of the external lens surface very quickly between moistening action of the wearer's eyelid which normally is urged frequently through blinking movements over the contact lens in order to keep the eye clear of dirt, dust and mucous. The wearer is thus made more conscious of his eyelid movements over the contact lens and thus finds this to be a source of discomfort.

An object of the present invention is to provide an improved methyl-methacrylate or similar plastic contact lens overcoming the foregoing and other shortcomings of the prior art. Specifically, it is an object to bond, in selected uniform thickness, an optimum hydrophilic material, e.g., quartz, to the external lens surface and thereby achieve a cushioning and lubricating liquid layer over said lens surface.

A plastic contact lens demonstrating objects and advantages of the present invention includes a plastic body with an appropriate optical shape and an external quartz surface vacuum bonded thereon. Since lenses are used in pairs, said quartz coating must be uniform for each pair; accordingly, apparatus aspects of the within invention include use of a cooperating pair of arcuate supports spaced the same radius from the quartz-vaporizing station, and holders for plural contact lenses mounted in spanning relation between said arcuate supports such that each lens is the same uniform distance from the vaporizing quartz. In this way, the handling of numerous small, and thus difficult-to-handle lenses, is readily managed, and moreover said management is, due to the uniform distance, effective in achieving a similar or uniform thickness of the quartz on each lens.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein:

FIG. 1 is a view which diagramatically illustrates the position of a contact lens during use;

FIG. 2 is a plan view, on a slightly enlarged scale, of an improved contact lens according to the present invention;

FIG. 3 is a side elevational view, in section taken along lines 3—3 of FIG. 2 of said contact lens, and wherein there is an exaggerated illustration of an exterior bonded quartz surface coating thereon;

FIG. 4 is a perspective view of apparatus for producing said quartz coating;

FIG. 5 is a plan view illustrating structural features of means for supporting the lenses during the application of a uniform coating of said quartz material thereon; and FIG. 6 is an isolated perpsective view showing further structural details of the manner in which said lenses are supported in their quartz-coating position.

Reference is now made to the drawings and in particular to FIGS. 1–3, wherein there is shown an improved contact lens, generally designated 10, demonstrating objects and advantages of the present invention. As is perhaps best shown in FIG. 3, lens 10 includes a plastic body 12, the material of construction of which will be understood to be methyl-methacrylate, a plastic material which affords the requisite optical properties while readily lending itself to shaping and other manipulation which provides proper fit thereof over the cornea 14 of the user. Thus, the inner shape or surface 16 of lens 10 is of a necessary conforming relation to the eye surface 14 so that there is a continuous hypertonic fluid exchange 18 to maintain the cornea 14 in its normal state of hydration, and the lens otherwise contributes to the proper metabolism of the cornea 14.

The aforesaid methyl-methacrylate plastic material, of which body 12 is comprised, is one which is known to be hydrophobic, or water-repellant and, as such, contributes to drying of the external lens surface 20 (see FIG. 1) very quickly between moistening action of the wearer's eyelid 22 which normally is urged frequently through blinking movements 23 over the contact lens 10 in order to keep the eye clear of dirt, dust and mucous and to establish the aforesaid fluid exchange 18. Thus, it is desirable that the external or outer lens surface 20 retain moisture thereon, since this increases clarity and comfort by providing a cushioning and lubricating effect between the inner surface of the eyelid 22 and this lens surface during said blinking movements 24. This, however, is not readily possible because of the hydrophobic character of the plastic body 12.

Stated another way, the non-wetting disadvantage of the methyl-methacrylate plastic body 12 is that when a drop of liquid is placed thereon, it does not spread out to cover the whole surface area thereof but ordinarily stays bunched up in the form of a drop. This tendency of liquid to either spread out or stay as a drop is decided by the relationship of the force of cohesion (attraction of the molecules of the liquid for each other) and adhesion (attraction of the molecules of the liquid for those of the solid plastic). The angle between the liquid surface and the solid surface is an indication of the relative value of the forces of adhesion and cohesion. This is known as the angle of contact, and the behavior of a liquid on a solid is spoken of in terms of a quality known as contact angle.

For present purposes, it suffices to note that the aforesaid contact angle (measured in degrees of arc) for water and quartz, namely silocon dioxide, is 0°. This implies a so-called hydrophilic tendency, or a complete wetting of the solid, i.e., quartz, by the liquid, i.e., water. Thus, it is contemplated in accordance with the present invention, that the plastic contact lens body 12 be provided with a uniform coating of quartz, designated 24, over its external lens surface 20. As a consequence, the quartz coating 24, which is hydrophilic, results in a complete spreading of any liquid placed in contact with it over its surface. This, in turn, contributes to a moisture retention which provides the aforesaid cushioning and lubricating effect between the inner surface of the eyelid 22 and the contact lens 10 and thus adds considerably to the comfort of wearing the contact lens 10.

Since the lenses 10 are used in pairs, it is necessary that the quartz coating 24 of each be uniform, or in other words have substantially the same thickness throughout. In most instances, this thickness should be approximately 0.6 microns.

The preferred apparatus for applying the quartz coating 24 is a high vacuum evaporator, designated 26 in FIG. 4, which may be any one of several commercially available models, such as the evaporator available from Veeco Instrument, Inc. of Plainview, N.Y. Cooperating with evaporator 26 is a unique support structure, generally designated 28, which forms a significant part of the present invention in that it readily enables a great number of the lenses 10 to be maintained in quartz-coating position during the operation of the evaporator 26, during which a uniform thickness of a quartz coating 24 is simultaneously applied to each of the lenses 10. In other words, the structure 28, in the manner as will be described in greater detail subsequently, readily enables a great number of lenses 10 to be handled during the application of the quartz coating thereon, and yet each quartz coating 24 is maintained uniform in any selected thickness.

Evaporator 26 includes a base 30 onto which there is seated, in sealed relation, a glass dome 32 which bounds an internal vacuum chamber 34. Extending into the medial portion of the base of the chamber 34 is a member 36 having means at its free end defining a vaporizing station 38 for solid quartz material. That is, as is well understood, at station 38 there is a source of heat applied to the solid quartz material which raises the temperature thereof within the vacuum atmosphere of chamber 34 to an extent which results in a change in state of the quartz from a solid to a vapor. The quartz vapor, designated 40, rises from station 38 to the top of chamber 34 and adheres to all surfaces in said chamber, including the internal surface of glass dome 32, as well as to the support structure 28. In fact, one of the contributions of the present invention is the recognition that the quartz vapor which fills the volume 34 and which, in response to a lowering of temperature, ultimately results in a surface coating on any surface to which it attaches, is significantly affected by the spaced relationship between the surface being coated and the source of the quartz material, namely station 38. Specifically, all things being equal, the same thickness of quartz material will be deposited on all surfaces which are spaced a similar distance from the station 38.

It is thus proposed in accordance with the present invention to provide an upper lens-holding structure, generally designated 42, on top of the vertical supports 28 on which there can be handled or mounted a maximum number of lenses 10 which each are spaced approximately the same distance from the station 38 so as to contribute to achieving a uniform quartz coating 24 on each of the lenses 10. To this end, structure 42 includes a circular ring or base 43 on which there are two arcuate bars or members 44 and 46 in spaced relation to each other. Contributing to the rigidity of the bars 44 and 46 are reinforcing members, individually and collectively designated 48. It will be understood that the curvature of the similar bars 44 and 46 is such that they are coincident with a length segment of the circumference of a circle located a selected distance or radius from the quartz vaporizing station 38. In other words, each point along each of the arcuate bars 44 and 46 is located the same uniform distance from the station 38. In a preferred embodiment, this distance is approximately 15 inches.

As is perhaps best shown in FIGS. 5, 6, the invention further contemplates the use of one or more holders 50 for the lenses 10, each in the form of a bar which is mounted in spanning relation between the arcuate supports 44 and 46. Each holder 50 has a notch 52 at each of its opposite ends in which the arcuate bars 44 and 46 are accommodated. Following this, each holder is held in place by the tightening of end thumb screws 54. Along a bottom surface of each member 50 there is applied a double adhesive surface tape 56 so that there is an adhesive surface presented in facing relation to the station 38. Adhesively engaged along the adhesive surface 56 are plural contact lenses 10, each external surface 20 thereof being in facing relation to the station 38. During application of the quartz coating 24 to the lenses 10, it is of course contemplated that a number of holders 50 will be mounted in spanning relation between the arcuate bars 44 and 46, as illustrated in FIG. 5, and that on each member 50 there will be a plurality of lenses 10. In this manner, a great number of lenses 10 are handled during a typical interval of operation of the evaporator 26 during which a uniform quartz coating 24 is applied to the external surface 20 of each contact lens 10.

A latitude of modification, change and substitution is intended in the foregoing disclosure, and in some instances some features of the invention will be employed without a corresponding use of other features. Accordingly, it is appropriate that the appended claims be construed broadly and in a manner consistent with the spirit and scope of the invention herein.

What is claimed is:

1. An apparatus for vacuum bonding a uniform hydrophilic quartz surface to a hydrophobic surface of plural contact lenses comprising means bounding a vacuum chamber, a quartz vaporizing station located within and adjacent the base of said vacuum chamber, cooperating arcuate supports located in parallel spaced relation to each other within and adjacent the top of said vacuum chamber, said arcuate supports occupying a selected uniform spaced relation from said quartz vaporizing station, and a plurality of rectilinear holders disposed in spanning relation between said arcuate supports, each said holder including bifurcated ends and clamping means for easy attachment to and removal from said supports, adhesive means on the undersurface of said holder whereby to support a plurality of said lenses and the angular relationship of said arcuate supports to the vaporizing station being such that said substrates are substantially uniformly spaced from said station whereby to effect a uniform deposition of the hydrophilic quartz surface.

* * * * *